UNITED STATES PATENT OFFICE.

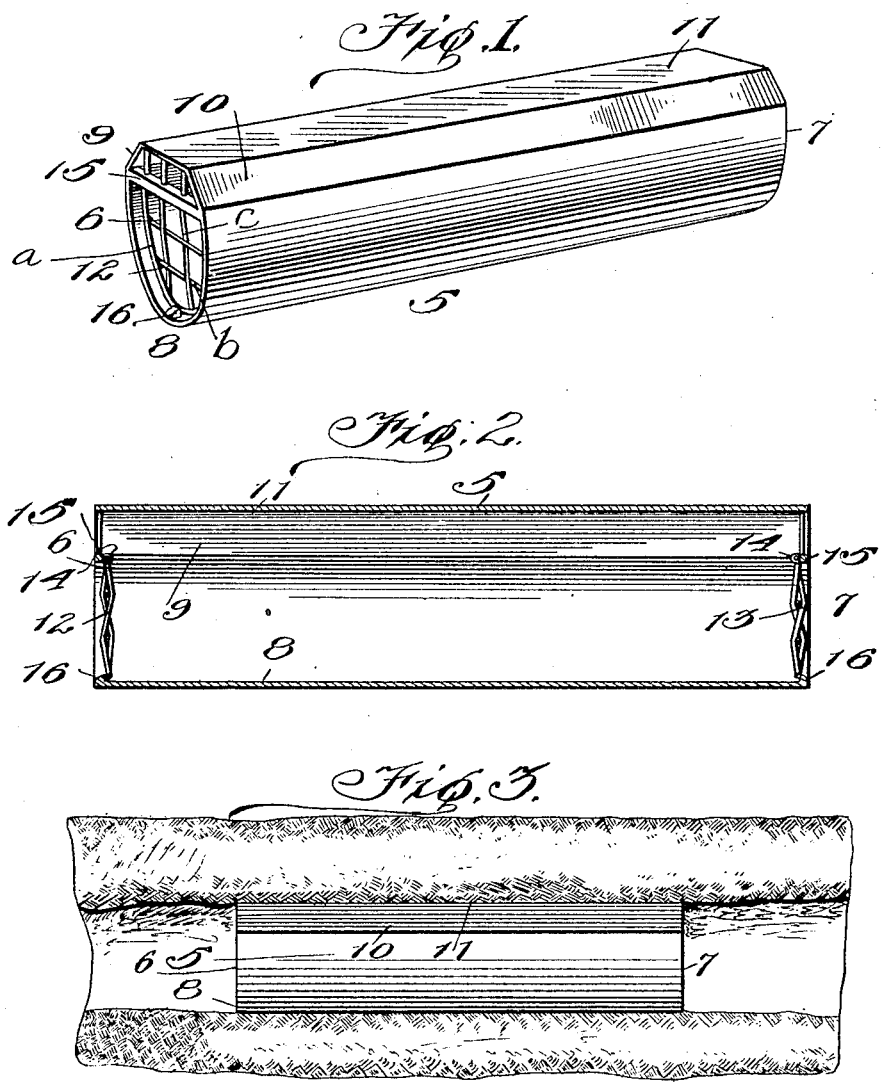

BERG A. MARTINSON, OF ORTONVILLE, MINNESOTA.

TRAP.

No. 904,706.  Specification of Letters Patent.  Patented Nov. 24, 1908.

Application filed December 12, 1907. Serial No. 406,194.

*To all whom it may concern:*

Be it known that I, BERG A. MARTINSON, a citizen of the United States, residing at Ortonville, in the county of Bigstone and State of Minnesota, have invented certain new and useful Improvements in Traps, of which the following is a specification.

This invention relates to traps, and more particularly to a trap adapted for catching muskrats, and has for its object to provide a simple and efficient trap of this character which may be manufactured at a relatively low figure.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a perspective view of the present trap, Fig. 2 is a vertical longitudinal sectional view through the same, Fig. 3 is a detail side elevational view showing the manner of using the trap.

Referring now more particularly to the drawings, there is shown a trap 5 consisting of an elongated sheet metal receptacle. The receptacle is open at each of its ends as shown at 6 and 7 respectively. The bottom of the trap is curved as shown at 8, and at the upper ends, the curved walls of the bottom are provided with upwardly inclined walls 9 and 10, and these walls are both connected by a horizontally extending top 11. Each open end of the trap is normally closed by doors 12 and 13 respectively, and each of these doors are hingedly connected as shown at 14 to a transversely extending cross-bar 15. The doors 12 and 13 are each formed of suitable foraminous material, which preferably consists of a curved wire *a*, transversely extending wires *b* and vertically extending wires *c*, and these doors are arranged for movement inwardly of the trap, as shown. The bottom portion 8 of the trap is provided with upwardly extending stops 16 preferably located at the center of the bottom, and these stops are thus arranged to limit the outward movement of each door 12 and 13.

The trap and its doors are preferably painted black, and this trap is arranged in a manner that it may be placed in a slough, and it will thus be seen that by means of the inwardly swinging doors 12 and 13 respectively the muskrats may enter either end of the trap, and by the provision of the stops 16, it will be seen that the rats are held safely within the trap.

While a trap of this character is particularly adapted for catching muskrats it will be seen that the same will be equally effective for catching mink.

What is claimed is:

A trap of the class described comprising an elongated hollow receptacle having a flat top wall, a curved bottom, connecting side walls and open ends, portions of the side walls adjacent to the top wall having longitudinally disposed flattened portions, swinging doors located within the receptacle and disposed adjacent to each end of the same, each door comprising a plurality of vertical and horizontally disposed interwoven wires and a connecting curved wire, stops carried by the receptacle and projecting therewithin from its bottom and arranged for engagement with the doors to limit their outward movement, and a transversely disposed brace rod located at each end of the receptacle, each rod having its ends connected to the side walls beneath their flattened portions and arranged to prevent the side walls from frictionally engaging the doors.

In testimony whereof I affix my signature, in presence of two witnesses.

BERG A. MARTINSON.

Witnesses:
 JOHN MICHELL,
 OLAF THOMPSON.